July 22, 1952  C. M. HOLM  2,603,993

MANUALLY FORMABLE SKID CHAIN STRAP APPLYING TOOL

Filed June 30, 1948

Inventor
CARL M. HOLM.
By Mawhinney & Mawhinney
ATTYS

Patented July 22, 1952

2,603,993

UNITED STATES PATENT OFFICE 2,603,993

MANUALLY FORMABLE SKID CHAIN STRAP APPLYING TOOL

Carl M. Holm, Wood-Ridge, N. J.

Application June 30, 1948, Serial No. 36,087

1 Claim. (Cl. 81—15.8)

The present invention relates to improvements in manually formable skid chain strap applying tool and has for an object the provision of an improved tool of this kind for greatly facilitating the proper positioning upon a tire of an automobile or the like of an emergency or anti-skid chain unit of the type which consists of one or more transverse chains and a fabric strap for securing the chain on the tire.

Another object of the present invention is the provision of an improved tool of this character which will enable the operator to quickly apply an emergency chain to a vehicle tire so that a great saving of time will be effected by the use of the present improved tool over those of the prior art.

A further object of the present invention is the provision of an improved tool of this kind with which an emergency chain can be applied to a vehicle tire without soiling the hands and clothing of the operator.

A still further object of the present invention is the provision of an improved tool of this type which can be easily bent by the hands of the operator without the use of tools, to substantially conform to the curvature of the tire so that the tool can be used in connection with tires of various sizes and types of treads.

The present invention aims to provide an improved tool of this character which is simple to operate so that an unskilled person can quickly and easily apply an emergency chain to a tire by the use of the improved tool.

The present invention also aims to provide an improved tool of this kind which is simple in construction, economical to manufacture and contains no moving parts to wear out or get out of order.

With the foregoing and other objects in view, the invention will be hereinafter more fully described and more particularly pointed out in the appended claim.

Figure 1:
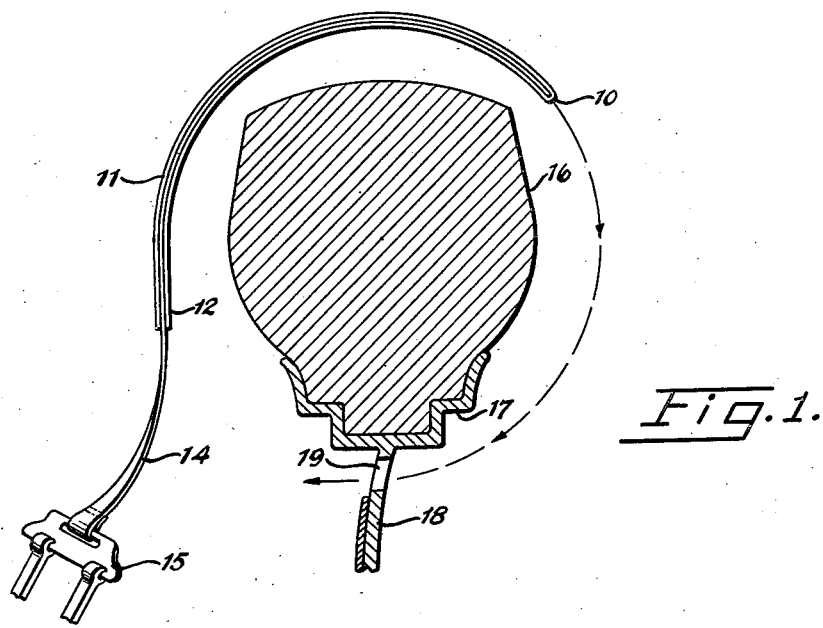
Figure 2:
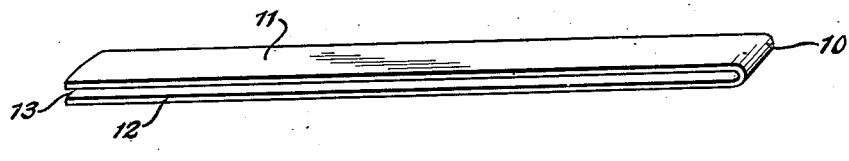
Figure 3:
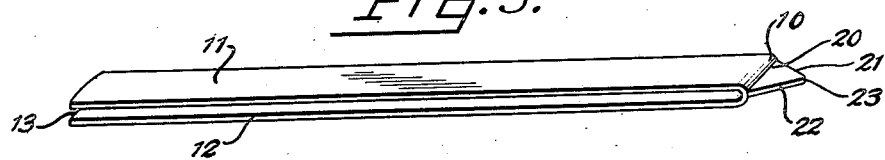
Figure 4:
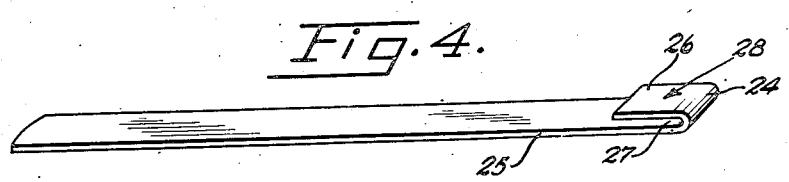
Figure 5:
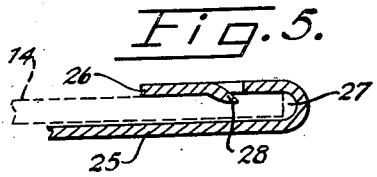

In the drawings, in which the same parts are denoted by the same reference numerals throughout the several views, Figure 1 is a fragmentary cross-sectional view through a tire and wheel and illustrating the manner in which the improved tool is used for applying a chain thereto, Figure 2 is a perspective view of the improved tool, Figure 3 is a perspective view of a modified form of the invention, Figure 4 is a perspective view of another modified form of the invention, and Figure 5 is an enlarged fragmentary longitudinal sectional view of the gripping means of the modification shown in Figure 4.

Referring more particularly to Figures 1 and 2 of the drawings, the improved emergency chain strap former or tool comprises an integral or unitary strip formed of a soft pliable metal or other suitable substance which is bent upon itself as indicated at 10 to form parallel spaced apart legs 11 and 12. The space between the legs 11 and 12 is indicated at 13. In Figure 1 the space 13 between the legs 11 and 12 of the tool is shown as having received the end of a fabric strap 14 of an emergency or anti-skid chain unit 15 which is adapted to be applied to the tread portion of a tire 16. The tire 16 is mounted upon a felly 17 of a wheel having a disk 18. The disk 18 has a plurality of openings or slots 19 for the reception of the tool and the fabric strap 14.

In the use of the former or tool illustrated in Figures 1 and 2 the operator will place the free end portion of the fabric strap 14 in the space 13 between the legs 11 and 12 of the tool. The operator of the device will then bend the legs 11 and 12, together with the fabric strap disposed therebetween, into a shape which substantially conforms to the curvature of the tread of the tire 16. Since the tool is made of a suitable pliable metal or other substance it will readily yield to this bending operation by the hands of the operator without the use of tools to effect the bending. The material from which the former or tool is made is of such a nature however that it will retain the form into which it has been fashioned until the operator changes such formation. The bending of the former or tool substantially to the contour of the tread of the tire 16 will effectively retain the free end portion of the fabric strap 14 within the space 13 between the legs 11 and 12 of the former or tool.

The operator will then grasp the open end of the tool which is remote from the bent portion 10 thereof and will move the tool from the outer side of the tire towards its inner side with the bent portion 10 as the leading edge of the tool as indicated by the arrows in Figure 1. When the bent portion 10 of the tool has passed through one of the slots 19 in the disk 18 the operator will grasp the bent portion 10 of the tool and pull the tool and the fabric strap 14 through the slot 19 until the tool has completely emerged from the slot 19 at which time the operator will disengage the tool from the strap 14 and the strap can be secured to the opposite end of the anti-skid chain unit 15. The emergency or anti-skid chain is now in proper position upon the tire 16 ready for use.

It will be noted that by the use of this tool it is not necessary for the operator to get under the automobile or to place his hands around the tire when applying the anti-skid chain to the tire 16 and therefore the hands and clothing of the operator will not become soiled.

In the form of the invention illustrated in Figure 3 the bent portion 10 of the former or tool has attached thereto in any suitable manner the base 20 of a triangular shaped guide. The sides 21 and 22 of the guide are of equal length and are disposed at the same angle to the base 20 and merge into a point or tip 23. The base 20 of the guide is of substantially the same length as the width of the bent portion 10 of the tool and the sides 21 and 22 diverge towards the base 20 so that the portions of the sides 21 and 22 which are adjacent the bent portion 10 of the tool provide a smooth unbroken guiding surface with the bent portion 10.

The manner of using the modified form of the improved tool shown in Figure 3 is substantially the same as that described in connection with the modification shown in Figures 1 and 2. The point or tip 23 of the guide will facilitate the locating of the slot 19 in the disk 18 and the sides 21 and 22 will cooperate with the sides of the slot 19 to assist in the passage of the tool through the slot 19. The unbroken surfaces presented by the sides 21 and 22 and the bent portion 10 of the tool will offer no resistance to the free passage of the tool through the slot 19.

In Figures 4 and 5 which show a further modification of the invention, the former or tool is formed from a single strip of pliable metal or other suitable material which is bent on itself as indicated at 24 to provide a long leg 25 and a short leg 26 parallel to and spaced from the long leg 25 to provide a space 27 therebetween. The short leg 26 has a downwardly extending struck out triangular shaped portion 28 which forms a tooth for biting into the fabric strap 14 to retain the strap within the space 27 between the legs 25 and 26.

In the use of the modification shown in Figures 4 and 5 the free end portion of the strap 14 is introduced into the space 27 between the long leg 25 and the short leg 26. The tooth 28 will bite into the fabric strap 14. It will be noted that the tooth 28 has its point extending in the direction opposite to the direction of withdrawal of the strap 14 so that any tendency of the strap 14 to withdraw from between the legs 25 and 26 will cause the tooth 28 to bite more firmly into the strap to prevent its withdrawal. The manner of using the modified form of tool shown in Figures 4 and 5 is substantially the same as that described in connection with the tool illustrated in Figures 1 and 2.

The guide member illustrated in Figure 3 may also be applied to the modifications of the tool illustrated in Figures 1, 2, 4 and 5.

It is obvious that various changes and modifications may be made in the details of construction and design of the above specifically described embodiment of this invention without departing from the spirit thereof, such changes and modifications being restricted only by the scope of the following claim:

What I claim is:

A tool for applying emergency tire chains of the type having a clamp at one end and a strap at the other end for engaging the clamp, said tool comprising a straight U-shaped pliable metal member, having parallel longitudinal legs spaced equidistantly apart throughout their entire length to longitudinally receive the end of a strap of an emergency chain, said legs being coextensive in length and bendable upon themselves transversely of the tool to clamp the strap therebetween and to conform to the configuration of the wheel mounted tire over the tread surface and around the inside of which the same is to be passed.

CARL M. HOLM.

REFERENCES CITED

The following references are of record in the file of this patent:

UNITED STATES PATENTS

| Number | Name | Date |
| --- | --- | --- |
| 105,895 | Bonham | Aug. 2, 1870 |
| 2,128,286 | Davis | Aug. 30, 1938 |
| 2,135,403 | Lewis | Nov. 1, 1938 |
| 2,155,466 | Bishop | Apr. 25, 1939 |
| 2,212,267 | Hudson | Aug. 20, 1940 |
| 2,234,902 | Keppel | Mar. 11, 1941 |